Oct. 7, 1969　　　　NAOYUKI UNO　　　　3,470,806
CAMERA THROUGH THE LENS LIGHT MEASURING SYSTEM
Filed Feb. 20, 1967
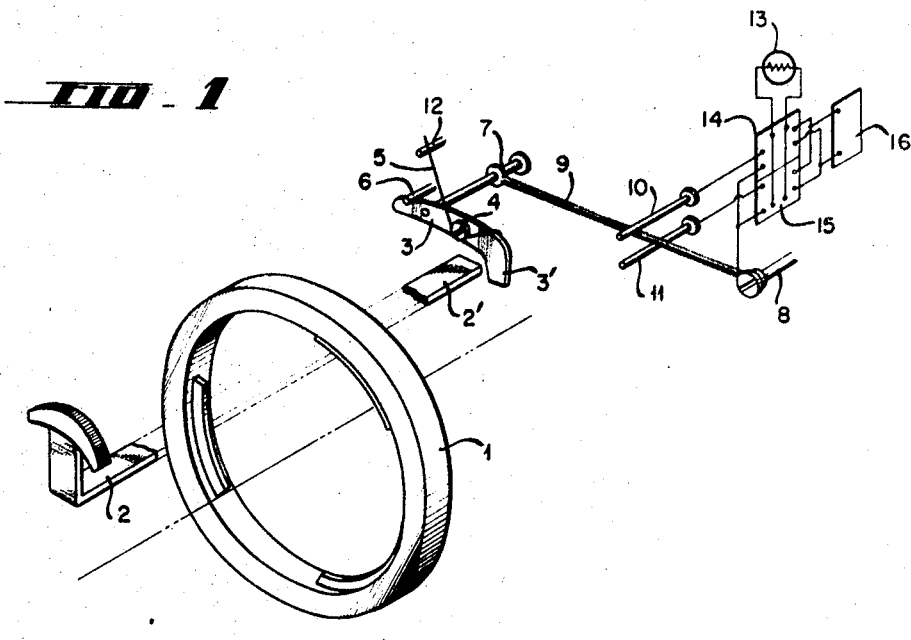
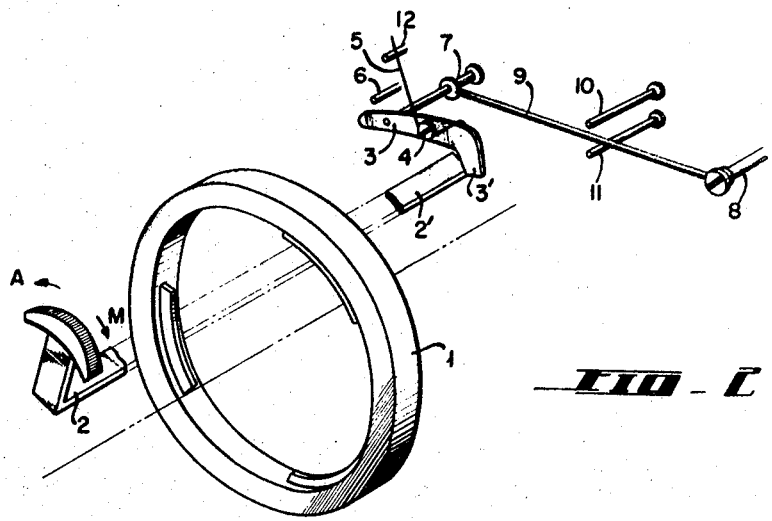
INVENTOR.
NAOYUKI UNO
BY *Stanley Wolder*
ATTORNEY United States Patent Office 3,470,806
Patented Oct. 7, 1969

3,470,806
CAMERA THROUGH THE LENS LIGHT MEASURING SYSTEM
Naoyuki Uno, Urawa-shi, Japan, assignor to Asahi Kogaku Kogyo Kabushiki Kaisha, Tokyo-to, Japan, a corporation of Japan
Filed Feb. 20, 1967, Ser. No. 617,339
Claims priority, application Japan, Feb. 28, 1966, 41/11,657
Int. Cl. G03b 19/12, 9/00
U.S. Cl. 95—42          7 Claims

ABSTRACT OF THE DISCLOSURE

A camera provided with an automatic preset lens which may be manually adjusted includes a selector lever for setting the diaphragm to a manual adjust condition or an automatic preset condition. A current meter is connected through a pair of circuit networks to a photoconductor exposed to light through the camera objective and diaphragm which are selectively actuated by a double throw switch operated by the selector lever so as to measure the incident light and provide an exposure parameter indication to correspond to a fully open diaphragm or a selectively manually closed diaphragm.

BACKGROUND OF THE INVENTION

The present invention relates generally to improvements in cameras provided with light measuring systems and it relates particularly to a light measuring system in cameras provided with automatic preset diaphragms which may be selectively manually adjusted.

In cameras, particularly those provided with interchangeable objectives, an accurate determination of the optimum exposure is achieved by means of an exposure meter arranged to measure the light from the object passing through the objective system. In a single lens reflex camera, the user may view the depth of focus by adjusting the diaphragm to the required aperture. Generally, with a camera having an exposure meter with its light receiving element exposed to the light which has passed through the objective and an automatic diaphragm (preset diaphragm), the exposure measurement is performed with the diaphragm fully open. When the objective is directed to the object after the shutter is set to the desired value, the proper diaphragm value corresponding to the set shutter speed value is indicated, the photographing operation being then performed with the diaphragm manually or automatically set to such indicated proper diaphragm value.

When the user observes the depth of focus with a single lens reflex camera with the automatic diaphragm being switched to a manual diaphragm position and by adjusting the diaphragm aperture, the amount of light passing through the objective diminishes as the diaphragm is stopped down. Therefore in such case the exposure meter indication of the desirable diaphragm aperture is not correct, and if the user inadvertently sets the diaphragm ring according to such indication an overexposure will result.

SUMMARY OF THE INVENTION

It is a principal object of the present invention to provide an improved camera light measuring system.

Another object of the present invention is to provide in a camera an improved through the lens or internal light measuring system.

Still another object of the present invention is to provide an improved through the lens light measuring system in cameras having automatic preset diaphragms which may be selectively manually adjusted.

A further object of the present invention is to provide a system of the above nature wherein an accurate exposure determination is assured whether the light measurement is performed with the diaphragm aperture fully open or manually reduced.

In a sense the present invention contemplates the provision of the combination comprising a camera including an objective and a diaphragm and selector means for selectively manually adjusting and presetting said diaphragm, a pair of circuit networks for measuring light passing through said objectives and diaphragm, and means responsive to said diaphragm adjusting and presetting selector means for alternatively actuating said circuit networks. The improved combination is advantageously characterized in that a light measuring circuit network for the manual depth of focus viewing operation and another light measuring circuit for the automatic diaphragm operation are connected to the exposure meter through a selector switch, and that this selector switch is connected to an automatic-manual diaphragm change-over or switching device. With such an arrangement the proper exposure value is always obtained even if the user inadvertently effects the measurement with the diaphragm manually stopped down, and the erroneous measurements which are frequently obtained with the conventional light measuring systems are obviated.

BRIEF DESCRIPTION OF THE DRAWING

FIGURE 1 is an exploded perspective and schematic view of a system embodying the present invention illustrated in an automatic diaphragm light measuring position; and FIGURE 2 is an exploded perspective view of the mechanism illustrated in a manually adjustable diaphragm position.

DESCRIPTION OF THE PREFERRED EMBODIMENT

Referring now to the drawing which illustrates a preferred embodiment of the present invention, the reference numeral 1 generally designates an objective mount which replacably supports an interchangeable objective (not shown) by means of a bayonet coupling arrangement. An automatic-manual diaphragm change-over or selector lever 2 is provided at the side of the interchangeable objective and includes an inner end 2' positioned adjacent to the hooked portion 3' of a rocker arm 3. The rocker arm 3 is swingagly supported by a shaft 4 and is urged clockwise by a spring 5. A stop 6 limits the clockwise swing range of the rocker arm 3.

A pin 7 is fixed to the rocker arm 3 at a point radially offset from the shaft 4. A movable contact member or switch arm 9 of resilient wire is provided with one end supported by a shaft 8 fixed to the camera body and the other end thereof lossely engaging the pin 7 so as to be movable therewith, whereby the movable contact member 9 alternatively engages or contacts one of the contact members 10 and 11 positioned on opposite sides of the switch arm 9 as the rocker arm 3 swings to opposite positions. A projection 12 engages one end of the spring 5 the other end of which engages the rocker arm 3.

A photosensitive element such as a photoconductor 13, for example a cadmium sulphide cell, is positioned in a known manner in the path of the light from an object to be photographed and which has passed through the camera objective and diaphragm, and is coupled to a pair of circuit networks 14 and 15 which may have common components and current source and whose outputs are connected to an electric responsive device such as a current meter 16. The contact 10 and switch arm 9 are coupled to the network 14 and the contact 11 and the switch arm 9 are coupled to the network 15 so that the engagement by the switch arm 9 of a contact 10 or 11 closes the corresponding circuit and actuates a respective network 14 or 15 and the associated photoconductor 13 and meter 16. The circuit including the network 14 is advantageously of the nature employed in the measuring of through the lens light of an automatic preset diaphragm system and the network 15 is advantageously of the nature employed in the measuring of through the lens light of a manually adjustable diaphragm system, both networks being known in the art. For example, the network 14 may provide a diaphragm aperture indication in accordance with or in response to the shutter setting and the network 15 may provide a shutter speed indication in accordance with or in response to the manual diaphragm aperture setting.

The change-over lever 2 is accessible at and positioned adjacent to the outside of the objective barrel on which there are provided indications A and M, designating automatic and manual diaphragm respectively. Thus, displacement of the lever 2 along the outer surface of the objective barrel effects a changeover operation between automatic and manual diaphragm.

When the change-over lever 2 is moved in the direction of A (automatic diaphragm), the end portion 2' is separated from the hooked portion 3' of the rocker arm 3 so that, due to the action of the spring 5, the rocker arm 3 swings clockwise to a position abutting the stopper 6. This raises the pin 7 so that the movable contact member 9 swings upwardly about the shaft 8 and engages the contact member 10, thus completing and activating the automatic diaphragm circuit 14. Accordingly, if the diaphragm ring is then set according to the indication of the indication of the exposure meter pointer, then upon exposure operation the proper diaphragm aperture corresponding to the shutter speed is automatically established.

When the change-over lever 2 is moved in the direction of M (manual diaphragm), the end portion 2' pushes up the hooked portion 3' and swings the rocker arm 3 counterclockwise against the action of the spring 5. As a result, the movable contact member 9 is separated from the contact member 10 and engages the other contact member 11, thus completing and activating the manual diaphragm circuit 15 to the exposure meter. Then, a shutter speed indication is provided corresponding to manual diaphragm variation in the known manner.

Thus, according to the present invention, the automatic and manual diaphragm exposure meter circuits may be automatically changed-over in association with the operation of the changeover lever. Owing to such arrangement, the erroneous exposure meter indication due to manual operation under preset diaphragm may be effectively avoided, and a proper exposure value corresponding to the desired diaphragm value is accurately indicated under manual operation, always assuring a proper exposure value indication and accordingly a proper exposure operation.

While there has been described and illustrated a preferred embodiment of the present invention, it is apparent that numerous alterations, omissions and additions may be made without departing from the spirit thereof.

I claim:
1. In combination with a camera including an objective and a diaphragm and selector means for selectively manually adjusting and presetting said diaphragm; photosensitive means exposed to light traversing said objective, first and second circuit networks for providing different measurements responsive to said photosensitive means corresponding to a diaphragm manually adjust condition and a fully open diaphragm preset condition respectively, and means responsive to said diaphragm adjusting and presetting selector means for alternatively actuating said circuit networks.

2. The combination of claim 1 wherein said photosensitive means comprises a common photosensitive element exposed to light passing through said objective and said diaphragm.

3. The combination of claim 1 wherein said circuit actuating means comprises a double throw switch including opposite contacts associated with respective of said circuit networks and a switch arm alternatively engageable with said contacts and operable with said diaphragm selector means.

4. The combination of claim 2 including spring means normally urging said switch arm into engagement with one of said contacts.

5. The combination of claim 1 wherein said circuit networks comprise a common current meter connected to the outputs of said circuit network.

6. The combination of claim 1 wherein said photosensitive means comprises a common photosensitive element exposed to light passing through said objective and said diaphragm and a common current meter connected to the outputs of said circuit networks, and said circuit actuating means comprises a double throw switch including opposite contacts associated with respective of said circuit networks and a switch arm alternatively engageable with said contacts and operable with said diaphragm selector means.

7. The combination of claim 6 including spring means normally urging said switch arm into engagement with one of said contacts.

References Cited

UNITED STATES PATENTS

| | | |
|---|---|---|
| 3,273,482 | 9/1966 | Starp. |
| 3,277,805 | 10/1966 | Starp. |
| 3,292,514 | 12/1966 | Starp. |
| 3,314,343 | 4/1967 | Rentschler. |
| 3,338,145 | 8/1967 | Rentschler et al. |

NORTON ANSHER, Primary Examiner

RICHARD L. MOSES, Assistant Examiner

U.S. Cl. X.R.

95—10